Jan. 19, 1971 D. K. LEINBACH 3,555,713

MICROFICHE HOLDER

Filed April 28, 1969 2 Sheets-Sheet 1

INVENTOR.
DONALD K. LEINBACH
BY
Brumbaugh, Graves, Donohue & Raymond
his ATTORNEYS INVENTOR.
DONALD K. LEINBACH
BY
Brumbaugh, Graves, Donohue & Raymond
his ATTORNEYS 3,555,713
MICROFICHE HOLDER Donald K. Leinbach, New York, N.Y., assignor to University Music Editions, Inc., New York, N.Y., a corporation of New York Filed Apr. 28, 1969, Ser. No. 819,852
Int. Cl. G09f *1/10*
U.S. Cl. 40—104.19 11 Claims

ABSTRACT OF THE DISCLOSURE

A microfiche folder for use in a loose-leaf ring binder comprising sheets of flexible, transparent material joined together to form a page-like structure having a plurality of pockets; at least one of the said pockets having an opening at the top edge for the easy removal therefrom of the microfiche. Another pocket, containing a card with a written description of the contents of the microfiche pocket and readily visible through the transparent pocket cover, has an opening directed toward the ring holes such that when the holder is engaged in the binder the rings will form a barrier for retaining the card therein.

BACKGROUND OF THE INVENTION

The present invention relates to a holder for sheets of microfilm and more particularly to a novel and improved holder for microfiche which not only contains easily accessible pockets for the microfiche but also a pocket, inaccessible when the holder is engaged in a binder, which holds a written index card describing the contents of the microfiche pockets.

In the past, the traditional form of microfilm publication was the 35 mm. roll-film. Every librarian is familiar with the drawer or file cabinet filled with cardboard boxes containing reels of sketchily identified microfilm. Every librarian is also familiar with the cumbersome process of threading the reels, of searching for the page, and then the noisy rewinding and removal of the roll of film from the viewer.

The roll-film format was primarily designed for commercial application and is ideal for strictly sequential viewing; but for most publications, particularly scholarly works where research is involved, microfiche is the ideal micro-form. Using microfiche, the reader may refer to the card or cards which contain the desired information without having to first scan page after page of irrelevant material. Also, due to the compact nature of microfiche, a wide variety of material may be examined without resorting to a tedious search of the library stacks in order to collect and pile up many volumes of possibly relevant data.

But simply publishing on microfiche is not enough. Because microfiche is a "unitized" format (i.e., each microfiche card is a separate publication unit containing a sequence of up to sixty pages of material), a special holder is necessary for proper organization. Without such a holder, the various pieces of microfiche would become easily mixed up and the efficient use thereof would become impossible. In addition, a means of identifying the separate pieces of microfiche and their respective contents is necessary. To attach the identifying means to each piece of microfiche would not only prove to be expensive but would make the search through hundreds of separately identified pieces a cumbersome and time consuming operation. Separate identification might also require changes in the microfiche format such as increasing the size and weight of the individual sheets.

SUMMARY OF THE INVENTION

There is provided, in accordance with the present invention, a microfiche holder which protects the microfiche from damage and which makes possible the bringing together of the inherent advantages microfiche has to offer the modern library and the familiar and logical organization of the binder or book form. By so doing the value of the microfiche format has been enhanced by making the information contained thereon uniquely available to the reader. More particularly, the invention comprises a microfiche holder formed from flexible sheets jointed together to form a page-like structure having a plurality of pockets. One or more of the pockets, preferably located at the lower half of the page-like structure, is opened at the top edge for the easy insertion and removal of microfiche. Another pocket, having at least one transparent facing and preferably located at the top half of the page-like structure, has an opening directed toward the side of the page-like structure such that when the structure is inserted in a binder, the binding means (i.e., rings, clamps, etc.) will render the pocket inaccessible. In this pocket is inserted a card or sheet with a written description or index thereon of the material shown on the microfiche contained in the pocket or pockets on the same page. The barrier formed by the binding means is desirable because the written descriptions and indices represent many hours of organizational work and the misplacing or even theft by the reader is to be avoided. On the other hand, the microfiche can be easily and inexpensively replaced in the event it is lost.

In order to best take advantage of the binder or book form, it is preferable to provide microfiche pockets on both sides of the page-like holder. The written description and indices of the microfiche held in the pocket on each side of the page-like holder may be inserted in a common pocket in such a way that the desired information is readable through the transparent pocket cover from the proper side of the page.

The holder may be formed by laying two sheets of flexible transparent material, such as vinyl, atop one another and by joining them, either by heat or by a suitable adhesive, along lines that will divide the space between the sheets into individual pockets. Since it is desirable to have microfiche pockets disposed on both sides of the holder, two addition sheets of flexible, though not necessarily transparent, material are placed on each side of the lower portion of the holder. By similarly joining these pieces to the two larger transparent pieces, pockets are formed on each side of the holder and are separated by the large transparent sheets. In such a way, a large pocket may be formed of the upper portion of the two transparent sheets for the insertion of the written descriptions while smaller pockets are formed on the lower portion of each side of the holder for the insertion of the microfiche. The resulting structure may then be inserted as a page into a ring binder or some similar holder.

BRIEF DESCRIPTION OF THE DRAWINGS

For a better understanding of the invention, reference may be made to the following description of an exemplary embodiment taken in conjunction with the figures of the accompanying drawings, in which.

DESCRIPTION OF THE PREFERRED EMBODIMENT

Figure 1:
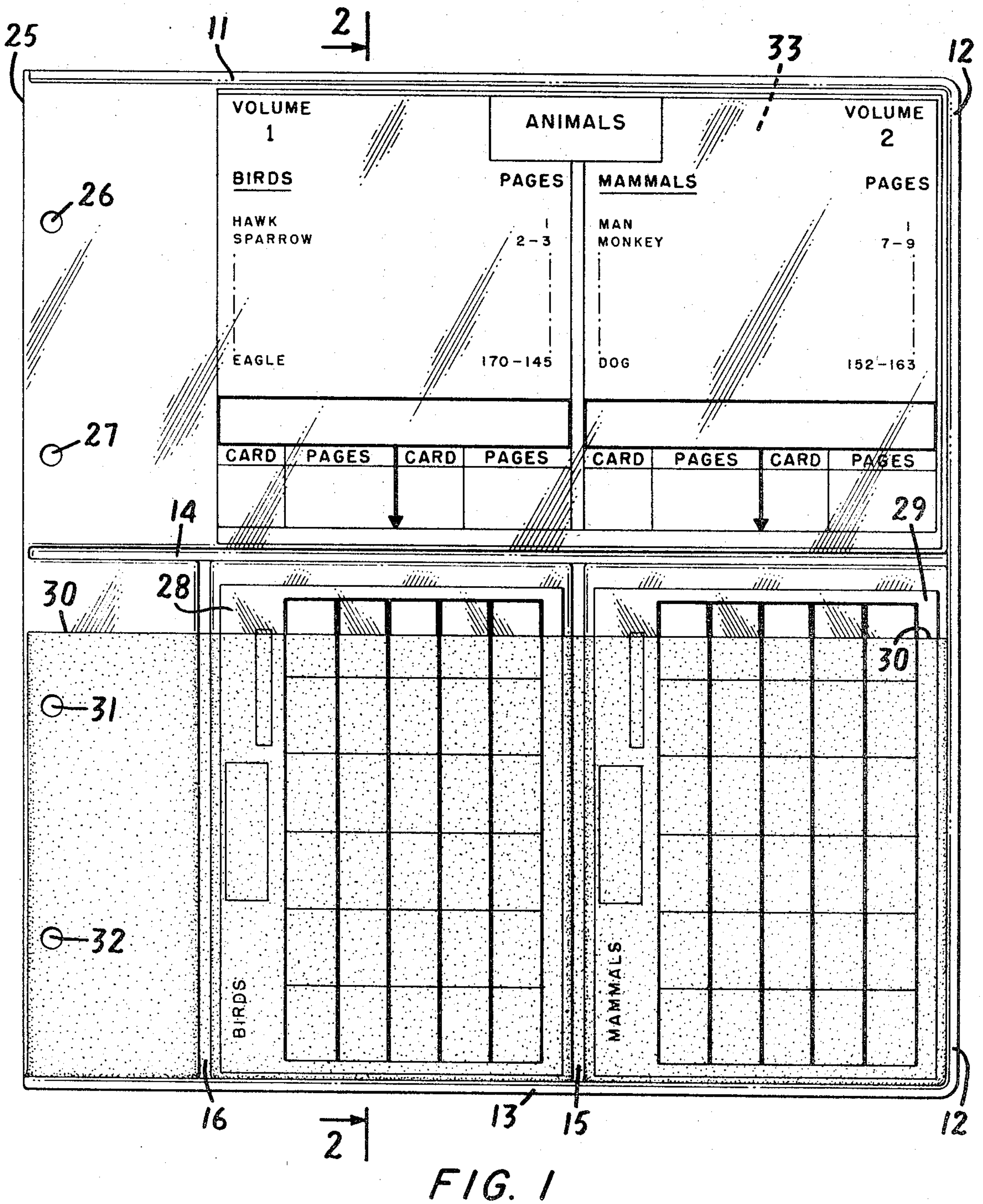
FIG. 1 is a plan view of a microfiche holder containing an index card and microfiche.

Referring to FIG. 1, a representative embodiment of the microfiche holder in accordance with the present invention comprises two sheets of rectangular transparent, flexible material, such as vinyl, placed atop one another and joined together (by heat or a suitable adhesive) along lines 11, 12, 13 and 14. Another sheet of flexible material, not necessarily transparent, is placed upon the lower portion of the holder and similarly joined to it along lines 12, 13, 15 and 16.

Figure 2:
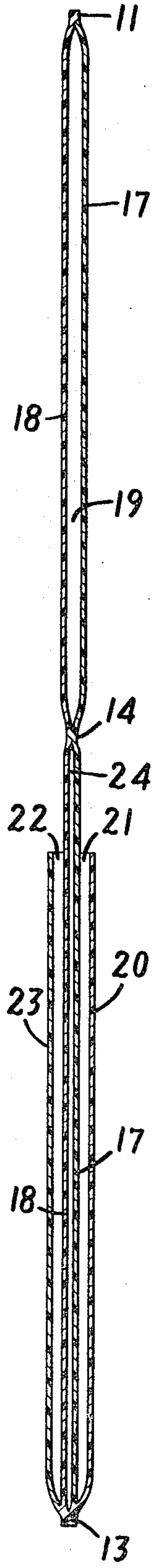
FIG. 2 is a sectional view taken on line 2—2 of FIG. 1 but which does not show either the index card or the microfiche.

What results, as is shown in FIG. 2, is a page-like structure consisting of the two transparent sheets 17, 18 joined together at 11, 14, 13 and leaving a space 19 between them for the insertion of an index or explanatory card. Sheets 17, 18 are also joined together along line 12 in FIG. 1 but this seam is not visible in FIG. 2. The addition of the smaller flexible sheet 20 joined to sheets 17, 18 at 13 forms a pocket 21 for the insertion of microfiche. A similar pocket 22 may be formed by joining a sheet 23 to the structure at 13. Both sheets 20, 23, are also joined to the holder along lines 12, 15, 16 in FIG. 1. These seams fail to appear in FIG. 2. It will be appreciated that if seams 15, 16 are formed by heat and pressure, all four sheets 17, 18, 20, 23 will be joined together along lines 15, 16. This need not be avoided since pocket 24 is not used. Furthermore, the four layer seams 15, 16 (as well as the four layer seams 12, 13) add strength and stiffness to the holder.

It is important to note that the two transparent sheets 17, 18, as shown in FIG. 2, are joined along lines 11, 12, 13 and 14 as shown in FIG. 1, but are not joined at the edge 25 which is to be held in the binder. This provides an opening to the pocket or space 19 between the two sheets for the insertion of an index or descriptive card and which will be inaccessible when the holder is put in the binder. Thus, the binding means (i.e. rings, rivets, bolts, etc.) will prevent the removal of the index card when said binding means are inserted in holes 26, 27. This will prevent the index card from being lost or inadvertently placed in the wrong holder.

On the other hand, the microfiche pockets 21, 22 (shown in FIG. 2) are easily accessible for the removal of the microfiche 28, 29 (shown in FIG. 1). To accomplish this the sheets 20, 23 are not joined to the transparent sheets 17, 18 along line 30 shown in FIG. 1. To prevent any interference that may result from the binder holes 31, 32 being engaged by the binding means, the microfiche pocket nearest the bound edge of the holder is separated therefrom by the attachment line 16.

FIG. 1 shows the index card 33 which is held in the pocket bounded by seams 11, 12, 14 and which is visible through the transparent sheet 17. It is clear from the drawing how such a written index, when placed in a transparent pocket adjacent to the microfiche pockets, can quickly direct the reader to the proper microfiche card.

Figure 3:
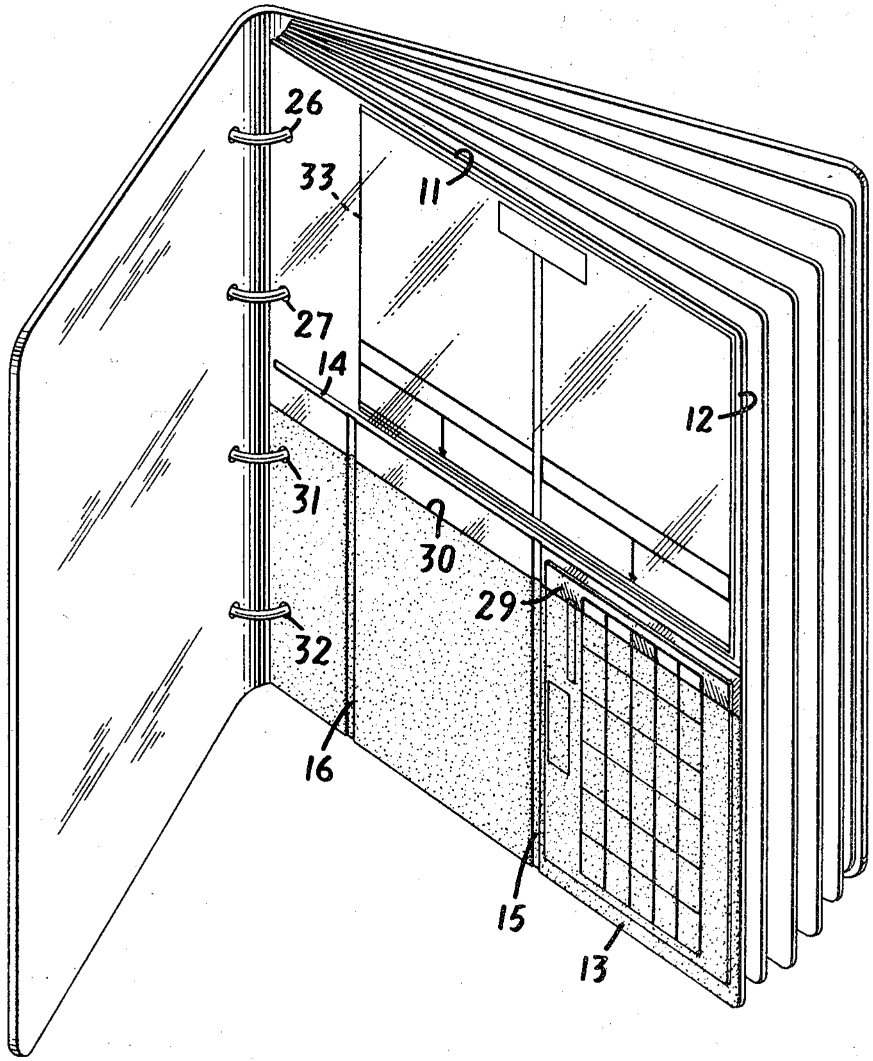
FIG. 3 is a perspective view of a binder containing microfiche holders.

In order to further facilitate the task of researching a given subject, the holder, with the index card and the microfiche, is inserted into a binder as shown in FIG. 3. Each holder constitutes a separate page in the binder thus permitting a great deal of information to be collected and organized under a common cover. In this way, such material as the complete works of a given author or composer, normally the equivalent of many volumes, is made available to persons or institutions who would normally have neither the means nor the space for such a collection.

It will be understood by those skilled in the art that the above described embodiment is intended to be merely exemplary, and that it is susceptible to modification and variation without departing from the spirit and scope of the invention. For example, while the holder has been shown to have two pockets for microfiche, a greater or lesser number may be preferred. Moreover, the binding means may take the form of a clamp which would obviate the need for the holes 25, 26 but which would still provide a barrier for the retaining of the index card in its pocket. It would also be possible to so place the pockets so that the index card pocket would be disposed at the lower portion of the holder while the microfiche pockets would be adjacent and above said index card pocket.

The holder, according to the invention, may also be arranged in such a way that the microfiche pockets are vertically adjacent each other and accessible at a side edge while the index card pocket is located at and comprises the portion of the holder to be inserted in the binder. Such an arrangement would be similar in appearance to the holder as shown in FIG. 1 except that FIG. 1 would have to be rotated ninety degrees counterclockwise and the index card pocket opening moved to edge 11.

All such variations are, therefore, included within the scope of the invention as set forth in the appended claims.

I claim:

1. A microfiche and index card holding book leaf for use in a binder and formed from sheets of flexible material comprising at least one microfiche pocket or envelope adapted for the insertion and removal of microfiche; another pocket or envelope with a transparent facing for sustaining an index card with a written description of the information shown on the sheets of microfiche in the said microfiche pocket and readily visible through the transparent pocket facing, said index card pocket having an opening directed toward the edge of the holder which is to be engaged in the binder such that when the holder is engaged in the binder the binding means will engage the pocket to form a barrier for retaining the card therein.

2. A microfiche and index card holding book leaf as described in claim 1 comprising two side-by-side adjacent microfiche pockets and an index card pocket.

3. A microfiche and index card holding book leaf as described in claim 1 wherein at least one microfiche pocket is located at the lower portion of the book leaf and the index card pocket is located at and comprises the upper portion of the book leaf.

4. A microfiche and index card holding hook leaf as described in claim 1 wherein the flexible material consists essentially of vinyl.

5. A microfiche and index card holding book leaf as described in claim 1 wherein the various sheets of flexible material are joined together by the application of heat and pressure along the desired attachment lines, thereby bonding the sheets together along said lines.

6. A microfiche and index card holding book leaf as described in claim 1 wherein the index card pocket or envelope and the microfiche pocket or envelope are located so that the printed material on the index card contained in the index card pocket or envelope will be in register with the corresponding microfiche sheets contained in the microfiche pocket or envelope.

7. A microfiche and index card holding book leaf as described in claim 6 wherein two rectangular sheets of flexible though not necessarily transparent material are attached respectively to opposite sides of the holder, thus forming microfiche pockets or envelopes on both sides of the book leaf.

8. A microfiche and index card holding book leaf as described in claim 1 comprising two rectangular panels of transparent flexible material overlying each other and joined along their top edge, bottom edge, one side edge, and the horizontal midline, the resulting upper envelope accessible at the unattached side edge for the insertion and removal of the index card; one other rectangular sheet of flexible though not necessarily transparent material overlying the lower portion of one of the transparent rectangular sheets and joined to it along the bottom edge, one side edge, and along two lines perpendicular to the bottom edge, said perpendicular lines spaced from each other and the side edge attachment line by a distance equal to the desired width of the microfiche pockets which will be formed thereby.

9. A binder containing as pages a plurality of the microfiche and index card holding book leaves as described in claim 1.

10. A binder as described in claim 9 wherein the binding means are such that they will render the index card pocket of each book leaf inaccessible when said book leaf is engaged in the binder.

11. A binder as described in claim 9 wherein the binding means are such that they may be inserted in holes in the edge of the book leaf, thus rendering the index card pocket of each book leaf inaccessible.

References Cited

UNITED STATES PATENTS

| | | | |
|---|---|---|---|
| 1,403,834 | 1/1922 | Berry | 40—104.19 |
| 2,421,503 | 6/1947 | Hermon | 40—104.19 |
| 2,449,204 | 9/1948 | Curtis | 40—104.19 |
| 2,986,144 | 5/1961 | Shepard | 40—104.19 |
| 3,299,929 | 1/1967 | Shagin et al. | 40—104.19 |

ROBERT N. MICHELL, Primary Examiner

W. J. CONTRERAS, Assistant Examiner

U.S. Cl. X.R.

40—159